United States Patent
Yamamoto et al.

(10) Patent No.: US 9,523,458 B2
(45) Date of Patent: Dec. 20, 2016

(54) BOX PROTECTOR FOR A THREADED JOINT FOR PIPES

(71) Applicants: NIPPON STEEL & SUMITOMO METAL CORPORATION, Tokyo (JP); DRILLTEC PATENTS & TECHNOLOGIES CORPORATION, Houston, TX (US)

(72) Inventors: Yasuhiro Yamamoto, Tokyo (JP); David W. Clem, Houston, TX (US)

(73) Assignees: NIPPON STEEL & SUMITOMO METAL CORPORATION, Tokyo (JP); DRILLTEC PATENTS & TECHNOLOGIES CORPORATION, Houston, TX (US)

( * ) Notice: Subject to any disclaimer, the term of this patent is extended or adjusted under 35 U.S.C. 154(b) by 0 days.

(21) Appl. No.: 14/372,520

(22) PCT Filed: Jan. 17, 2013

(86) PCT No.: PCT/JP2013/051364
§ 371 (c)(1),
(2) Date: Jul. 16, 2014

(87) PCT Pub. No.: WO2013/108932
PCT Pub. Date: Jul. 25, 2013

(65) Prior Publication Data
US 2014/0352837 A1 Dec. 4, 2014

(30) Foreign Application Priority Data
Jan. 19, 2012 (JP) .................................. 2012-008923

(51) Int. Cl.
*F16L 57/00* (2006.01)
*F16L 58/18* (2006.01)
(Continued)

(52) U.S. Cl.
CPC ............ *F16L 57/005* (2013.01); *E21B 17/006* (2013.01); *F16L 15/004* (2013.01); *F16L 58/182* (2013.01); *C10N 2250/08* (2013.01)

(58) Field of Classification Search
USPC ......................................... 138/89, 96 R, 96 T
See application file for complete search history.

(56) References Cited

U.S. PATENT DOCUMENTS 4,487,228 A * 12/1984 Waldo .................... B65D 59/02
138/89
4,549,337 A * 10/1985 Newell ................... B29C 70/78
138/96 T (Continued)

FOREIGN PATENT DOCUMENTS

JP 09-072467 3/1997
JP 2003-240188 8/2003

(Continued)

*Primary Examiner* — James Hook
(74) *Attorney, Agent, or Firm* — Clark & Brody

(57) ABSTRACT

A box protector 21 for protecting the inner surface of a box 11 of a threaded joint for pipes having a female threaded portion and a shoulder surface 14 with the shoulder surface being sloped by an angle θ with respect to the direction perpendicular to the pipe axis has a male threaded portion 22 which threadingly engages with at least a portion of the complete threads of the female threaded portion of the box and a shoulder surface 21b which sealingly contacts the shoulder surface 14 of the box to form a first seal portion, and the shoulder surface 21b is sloped by an angle θP (θP>θ) with respect to the direction perpendicular to the pipe axis. The protector has a circumferential groove 30 in its outer peripheral surface in the vicinity of the shoulder surface 21b and an elastic seal ring 28 which contacts the shoulder surface 14 of the box 11 and forms a second seal portion.

8 Claims, 7 Drawing Sheets

(51) Int. Cl.
*F16L 15/00* (2006.01)
*E21B 17/00* (2006.01)

(56) References Cited

U.S. PATENT DOCUMENTS

| | | | | |
|---|---|---|---|---|
| 4,582,090 | A * | 4/1986 | Chase | B65D 59/06 138/89 |
| 4,796,668 | A * | 1/1989 | Depret | B65D 59/00 138/96 R |
| 4,957,141 | A * | 9/1990 | Dreyfuss | F16L 57/005 138/89 |
| 5,195,562 | A * | 3/1993 | Dreyfuss | F16L 57/005 138/89 |
| 5,244,015 | A * | 9/1993 | Dreyfuss | F16L 57/005 138/89 |
| 6,196,270 | B1 * | 3/2001 | Richards | B65D 59/02 138/96 R |
| 8,622,091 | B2 * | 1/2014 | Yamamoto | F16L 57/005 138/145 |
| 2003/0111838 | A1 * | 6/2003 | Goto | C10M 111/04 285/94 |
| 2005/0045240 | A1 * | 3/2005 | Casteran | F16L 15/004 138/96 T |
| 2005/0166986 | A1 * | 8/2005 | Dell'erba | B65D 59/06 138/96 T |
| 2006/0042709 | A1 * | 3/2006 | Takano | F16L 57/005 138/96 T |
| 2008/0222843 | A1 * | 9/2008 | Kovacs | B65D 59/02 16/108 |
| 2011/0203698 | A1 * | 8/2011 | De Diego Reyes | F16L 57/005 138/96 T |
| 2013/0213516 | A1 * | 8/2013 | Clem | F16L 57/005 138/96 T |

FOREIGN PATENT DOCUMENTS

| | | |
|---|---|---|
| JP | 2010-519478 | 6/2010 |
| WO | 2006/075774 | 7/2006 |
| WO | 2006/104251 | 10/2006 |
| WO | 2007/042231 | 4/2007 |
| WO | 2011/027433 | 3/2011 |

* cited by examiner

BOX PROTECTOR FOR A THREADED JOINT FOR PIPES

TECHNICAL FIELD

This invention relates to a box protector for protecting a box of a threaded joint for pipes which is used to connect oil country tubular goods (OCTG) and which is constituted by a pin and a box until the joint is used. A box protector according to the present invention is particularly suitable for protecting a box of a threaded joint for pipes which is previously lubricated by a solid lubricating coating and which does not require application in the field of a viscous liquid lubricant to the threaded joint before connecting oil country tubular goods.

BACKGROUND ART

Oil country tubular goods such as tubing and casing used for exploitation of crude oil or gas oil are connected with each other by threaded joints for pipes. A typical threaded joint for pipes used for connecting oil country tubular goods has a pin-box structure. A pin is a joint component having male (external) threads, and a box is a joint component having female (internal) threads. Typically, a pin is formed on the outer peripheral surface of both ends of a steel pipe used as an oil country tubular good, and a box is formed on the inner peripheral surface of both sides of a coupling, which is a separate member. In special threaded joints having excellent gas tightness, an unthreaded metal contact portion having a seal surface and a shoulder surface (also referred to as a torque shoulder) is formed at the end of the male threads of a pin and at the base of the female threads of a box. The threaded portions and the unthreaded metal contact portions form the contact surface of a threaded joint for pipes. With this type of threaded joint for pipes, excellent gas tightness is obtained by inserting one end of an oil country tubular good into a coupling and threadingly engaging the male threads and the female threads until the unthreaded metal contact portions of the two members contact each other to form metal-to-metal seals.

FIG. 6 is an explanatory view schematically showing the assembled structure of a typical threaded joint for pipes and showing the state of a steel pipe for an oil country tubular good and a coupling at the time of shipment. As shown in this figure, a pin 1 having a male threaded portion 3a is formed on the outer peripheral surface of both ends of a steel pipe A, and a box 2 having a female threaded portion 3b is formed on the inner periphery of both sides of a coupling B. The coupling B is previously connected to one end of the steel pipe A. As shown in FIG. 6, a coupling-type threaded joint for pipes is normally shipped in a state in which the coupling B is connected to the steel pipe A.

Accordingly, at the time of shipment, of the two pins and two boxes, one pin and one box are connected to each other. Although not shown in this figure, on the other pin and box which are not used for connection to each other, namely, the left-hand pin and the right-hand box in the figure, a pin protector and a box protector, respectively, are mounted prior to shipment in order to protect the contact surfaces of the pin and box against rusting, scratches, and infiltration of foreign matter. These protectors are removed before use.

A pin protector and a box protector each typically comprise a tubular body which is somewhat longer than the threaded joint and which is normally made of a resin or a metal-reinforced resin. These protectors are typically closed at one end or in the vicinity of one end, but there are also protectors which are open at both ends.

A pin protector has female threads on its inner peripheral surface which threadingly engage with the male threads of a pin, and it is mounted on a pin by thread engagement. Similarly, a box protector has male threads on its outer peripheral surface which threadingly engage with the female threads of a box, and it is mounted on a box by thread engagement. At this time, the pin protector is sufficiently tightened until its female threads interfere with the male threads of the pin so that the protector will not fall off even if it receives an impact during transport or handling after shipment. Similarly, the box protector is sufficiently tightened until its male threads interfere with the female threads of the box. A pin protector and a box protector including their threads are normally manufactured by injection molding, and the threaded portions of a pin protector and a box protector are formed of the same resin as the main body of the protectors.

In order to guarantee galling resistance and gas tightness at the time of makeup of oil country tubular goods, a viscous liquid lubricant referred to as a compound grease or dope and containing a heavy metal powder has been applied in the field to the contact surfaces (the threaded portions and the unthreaded metal contact portions) of threaded joints. Such a compound grease is prescribed by API BUL 5A2. Compound grease also has a corrosion-preventing function which prevents rusting of the contact surface to which it is applied.

In the past, when mounting a pin protector or a box protector on a pin or a box, compound grease or other lubricating grease (such as a lubricant referred to as green dope which does not contain a heavy metal powder) has been applied to the contact surface. The lubricating grease has fluidity and can fill the space between a protector and a pin or a box. Therefore, even if a protector is not specially provided with a seal mechanism, the contact surfaces of the pin and box are isolated from the exterior, and a corrosion-preventing function and a function of preventing infiltration of foreign matter are achieved.

However, in recent years, environmental regulations are becoming stricter around the world, and there is a demand for threaded joints for pipes which can be made up without using compound grease since compound grease contains a large amount of heavy metal powder which can have an adverse effect on humans and living organisms. It is also desired that lubricating treatment of threaded joints for pipes in the field be made unnecessary in order to increase the operating efficiency.

A typical example of such a threaded joint for pipes is one like that disclosed in Patent Document 1, for example, in which the contact surface of one or both of a pin and a box is coated with a solid lubricating coating having a lubricating powder (such as molybdenum disulfide or graphite) dispersed in a resin.

Patent Document 2 discloses a threaded joint for pipes in which the contact surface of at least one of a pin and a box is coated with a two-layer coating having a viscous liquid or semisolid lubricating coating and atop it a dry solid coating. The dry solid coating may be a coating of a thermosetting resin such as an acrylic resin or a coating of an ultraviolet curing resin.

Patent Document 3 discloses a threaded joint for pipes in which a thin, non-tacky lubricating coating comprising a lubricating powder dispersed in a solid matrix exhibiting plastic or viscoplastic rheological behavior (flow properties) is formed on the surfaces of the threads of a pin and a box.

The matrix preferably has a melting point in the range of 80-320° C., and the coating is formed by hot melt spraying, flame coating using a powder, or spray coating of an aqueous emulsion.

Patent Document 4 discloses a threaded joint for pipes in which the contact surface of at least one of a pin and a box is coated with a two-layer coating having a solid lubricating coating comprising a lubricating powder and a binder, and atop it a solid corrosion-preventing coating which does not contain solid particles.

Similarly, a protector which is mounted on a threaded joint for pipes having such a lubricating coating and particularly a solid lubricating coating formed thereon and which is made up without using a compound grease is preferably mounted on a pin or a box without using a lubricating grease. However, in this case, a seal is not provided by a lubricating grease, so it is necessary for a pin protector or a box protector itself to have sealing properties. There have been some proposals in this respect in the prior art.

For example, as shown in FIG. 7, Patent Document 5 discloses a box protector 4 for a threaded joint for pipes having sealing properties in which the protector has a first seal portion 4b and a second seal portion 4c each in the form of an elastic annular projecting body made of the same material as the protector body 4a in the positions opposing the shoulder stoppers 5a and 5b of a box 5.

As shown in FIG. 8, Patent Document 6 discloses a box protector 6 for a threaded joint for pipes having a seal of increased reliability by using an elastic seal ring 6c which is mounted on the outer peripheral surface 6b of the protector body 6a opposing the end surface 7a of a box 7 as a first seal portion and using the end surface 6d opposing the torque shoulder 7b of the box 7 as a second seal portion.

Patent Document 1: JP 09-72467 A1
Patent Document 2: WO 2006/104251
Patent Document 3: WO 2007/042231
Patent Document 4: WO 2006/75774
Patent Document 5: JP 2003-240188 A1
Patent Document 6: WO 2011/027433

SUMMARY OF THE INVENTION

As shown in FIGS. 7 and 8, a conventional box protector for a threaded joint for pipes having a solid lubricating coating provides desired sealing properties by a first seal portion in the position opposing the end surface of a box or in the vicinity thereof, and a second seal portion in the position opposing the end surface of the inner rear portion of the box (a torque shoulder) or in the vicinity thereof, both seal portions sealingly (intimately) contacting the opposing surfaces of the box.

In actual practice, however, it is not easy to maintain a state in which both the first seal portion and the second seal portion sealingly contact the box, and there is the problem that water, oil, or the like infiltrates the space between the protector and the box through a seal portion which does not sealingly contact the box, and as a result, the solid lubricating coating which covers the contact surface of the box deteriorates.

Namely, the body 4a of the box protector 4 disclosed in Patent Document 5 and shown in FIG. 7 is made of a resin material such as nylon having elasticity. Even though the first seal portion 4b and the second seal portion 4c which are made of the same material as the protector body 4a have a certain amount of elasticity, there is a limit to the sealing ability which can be obtained by relying on their elasticity. Therefore, it is not easy to prevent the occurrence of a gap at the end surface at the inner rear portion of the box (the torque shoulder) or in its vicinity with certainty. In addition, the acute front tip corner of the protector indicated by 5c tends to easily chip away.

In the case of the box protector 6 disclosed in Patent Document 6 and shown in FIG. 8, if the environmental temperature rises, the protector body 6a expands and the length of the protector body 6a in the axial direction increases. As a result, when the box protector 6 is mounted on a box 7, the tip 6d of the protector intimately contacts the torque shoulder 7b of the box 7 before its elastic seal ring 6c intimately contacts the end surface 7a of the box, and a gap forms between the elastic seal ring 6c and the end surface 7a. Even if this gap is very small such as around 0.03 mm, water or the like can pass through the gap and infiltrate the space between the box and the protector.

In this manner, a conventional box protector for a threaded joint for pipes develops a gap at the end surface of the box or at the end surface at the rear inner portion of the box (the torque shoulder) when the box protector is mounted on the box, and it is difficult to reliably prevent water or oil or dust from infiltrating through the gap which develop.

The object of the present invention is to provide a box protector for a threaded joint for pipes which can intimately contact both the end surface and the inner rear portion of a box with certainty, thereby preventing the infiltration of water, oil, or dust into the space between the box and the protector and preventing deterioration of a solid lubricating coating formed on contact surface of the box and corrosion of the contact surface.

The present invention is a box protector for a threaded joint for pipes which is mounted on a box of a threaded joint for pipes having a pin-box structure in order to protect a contact surface of the box, the contact surface of the box having a female threaded portion including complete threads and an unthreaded metal contact portion including at least a shoulder surface, the shoulder surface sloping so as to recede towards the central axis of the threaded joint by an angle $\theta$ with respect to the direction perpendicular to the axis of the threaded joint ($\theta > 0$) or being parallel to the direction perpendicular to the axial direction on the entrance side of the box ($\theta = 0$), wherein the box protector has a tubular body made of a resin with an axial length which is longer than that of the contact surface of the box and having a structure which can form a first seal portion and a second seal portion which contact the surface of the box on both sides of the contact surface of the box, and the tubular body has on its outer peripheral surface a male threaded portion which threadingly engages with at least a portion of the complete threads of the female threaded portion of the box, the box protector being characterized in that:

the tubular body of the protector has a shoulder surface which forms a first seal portion which sealingly contacts the shoulder surface of the box, the shoulder surface of the protector slopes to the rear in the direction of insertion of the protector towards the center axis of the joint by an angle $\theta P$ with respect to the direction perpendicular to the pipe axial direction, and the angle of slope $\theta P$ of the shoulder surface of the protector is larger than the angle of slope $\theta$ of the shoulder surface of the box;

the tubular body of the protector has a circumferential groove in its outer peripheral surface in the vicinity of the shoulder surface of the protector, and the position and the cross-sectional shape of the circumferential groove are such that under a torque applied when mounting the protector, a portion of the tubular body in the vicinity of the circumferential groove elastically deforms so as to reduce the distance in the axial direction at the opening of the circumferential groove, thereby ensuring the formation of the first seal portion; and the second seal portion is formed by contacting an elastic material attached to the protector with the box surface.

In preferred embodiments, the box protector according to the present invention satisfies at least one of the following conditions:

the circumferential groove has an axial cross-sectional shape selected from a V shape, an arc shape, a U shape, a trapezoid shape, and a combination of these shapes;

the elastic deformation of the tubular body causes the distance in the axial direction at the opening of the circumferential groove to decrease by at least 0.2 mm;

the second seal portion is formed by an elastic seal ring which is disposed on the outer peripheral surface of the tubular body of the protector so as to sealingly contact the box end surface when the protector is mounted on the box;

the entire contact surface of the box or a portion thereof including at least the female threaded portion of the box is covered by a solid lubricating coating;

the thread height (H1) of the male threaded portion of the tubular body of the protector and the thread height (H2) of the complete threads of the female threaded portion of the box satisfy H1>H2, and the difference [H1-H2] between H1 and H2 is larger than the maximum coating thickness of the solid lubricating coating on the thread crests of the female threaded portion of the box;

the male threaded portion of the protector has 3-5 threads; and the male threaded portion is disposed at a position opposing the female threads closest to the box entrance of the complete threads of the box.

A box protector for a threaded joint for pipes according to the present invention can reliably sealingly contact both the end surface of the box and the shoulder surface on the inner rear portion thereof to form a seal portion in both positions, thereby preventing infiltration of water, oil, or dust into the space between the box and the protector with certainty. As a result, corrosion of the contact surface of a box is prevented, and when the contact surface is covered by a solid lubricating coating, deterioration of the coating can be prevented.

MODES FOR CARRYING OUT THE INVENTION

Figure 6:
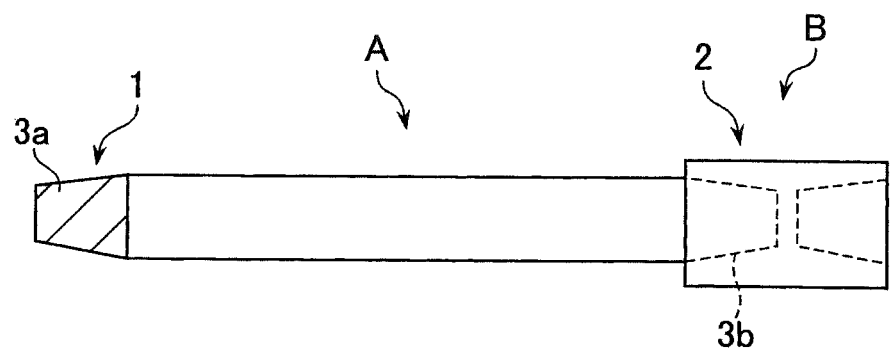
FIG. 6 is an explanatory view schematically showing the assembled structure of a typical threaded joint for pipes showing the state of a steel pipe for an oil country tubular good and a coupling at the time of shipment.

A box protector according to the present invention can be applied not only to the box of a coupling-type threaded joint for pipes like that shown in FIG. 6 but also to the box of an integral threaded joint for pipes in which one end of a steel pipe is made a pin and the other end is made a box. A coupling-type threaded joint typically makes the outer peripheral surface of an end of a steel pipe a pin and makes the inner peripheral surface of a coupling a box, but the opposite combination is also possible.

In the following explanation, the present invention will be explained with respect to a box protector which is mounted on a special threaded joint having excellent gas tightness, with the threads of the joint being tapered threads and the unthreaded metal contact portions having a seal surface. However, the threads of a threaded joint for pipes need not be tapered. In addition, a protector according to the present invention can be applied to a threaded joint for pipes in which the unthreaded metal contact portions do not have a seal surface and are constituted only by a shoulder surface. Furthermore, there is no particular limitation on the thread shape of a threaded joint for pipes. The threads can be buttress threads (trapezoidal threads) specified by API standards, or they can be so-called hook threads in which the load flank angle of the threads has a negative value.

An explanation will be given of an example of a box protector of the type which is closed slightly before its front end. Here, the front end means the end on the front side in the direction of insertion of the protector when mounting the protector, and it is also referred to as the leading end. However, both ends of the tubular body forming the protector may be open, and in the case of a closed type, the location where the tubular body is closed is not limited. In addition, a protector may also be of the type in which the rear end is closed by a removable lid.

The box of a threaded joint for pipes which is protected by a box protector according to the present invention preferably has the below-described solid lubricating coating on at least the threaded portion of the box and preferably on the entirety of the contact surface including the threaded portion and the unthreaded metal contact portion. However, the present invention can also be applied to a threaded joint for pipes which does not have a lubricating coating or which has a viscous liquid lubricating coating on the contact surface of the box.

Figure 1A:
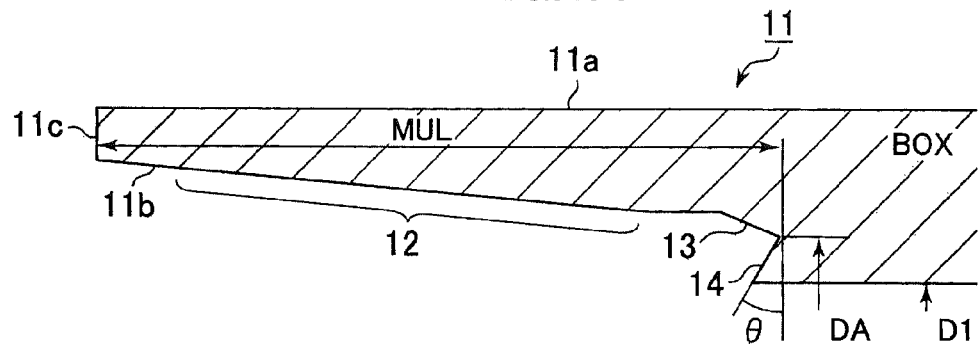
FIGS. 1A, 1B, and 1C are an explanatory view of a box of a threaded joint for pipes, a box protector according to the present invention, and the protector mounted on the box, respectively.
Figure 1B:
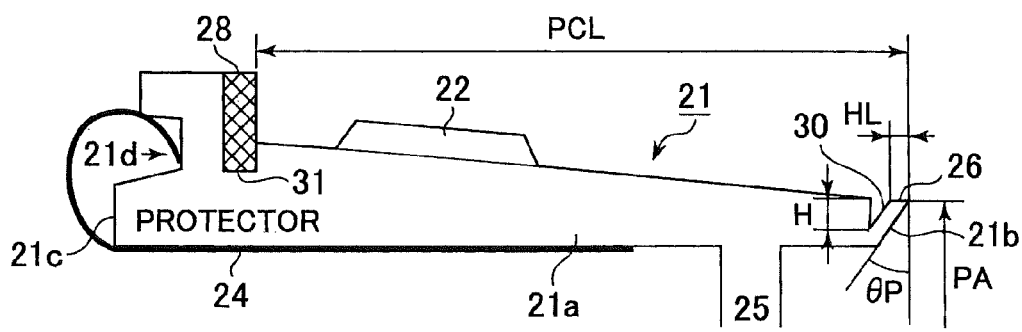
Figure 1C:
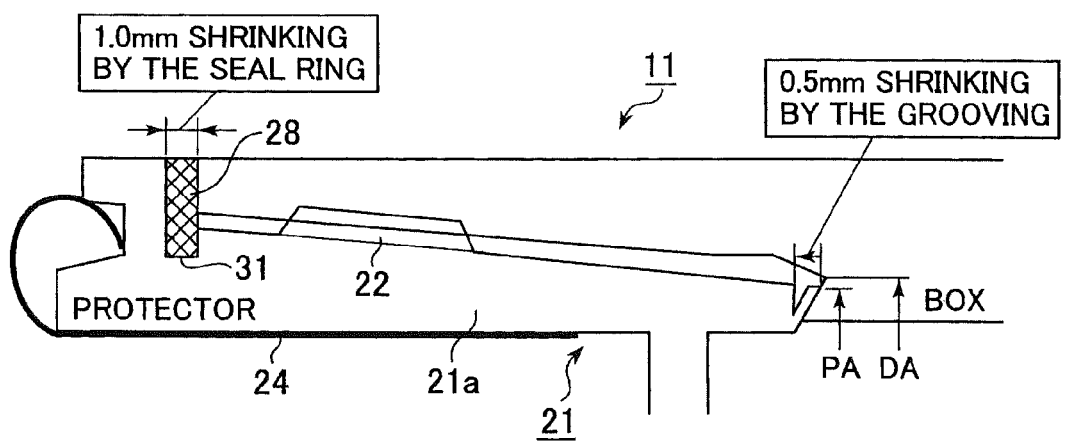
Figure 2:
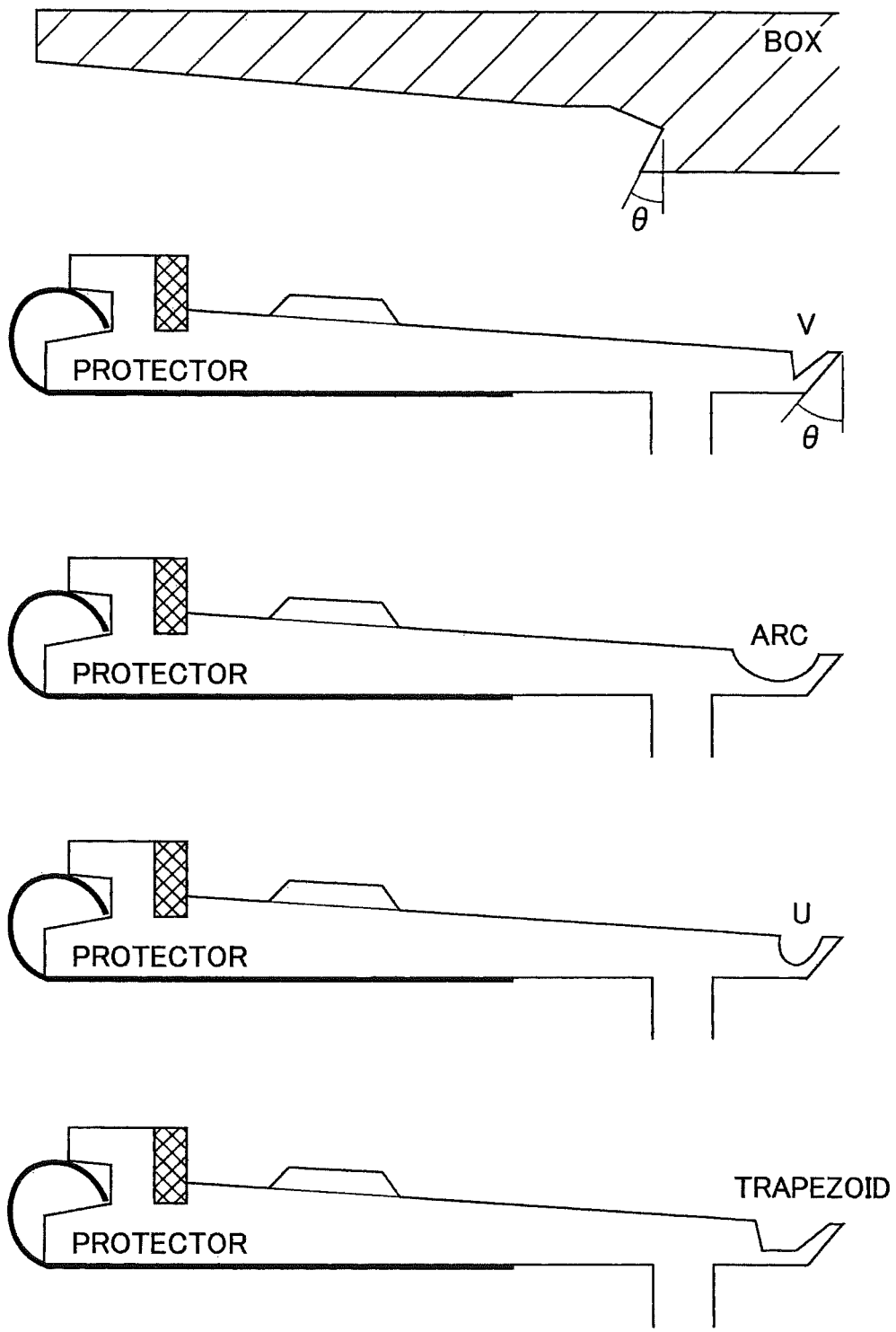
FIG. 2 is an explanatory view showing various cross-sectional shapes in a pipe axial direction of a circumferential groove of a box protector according to the present invention along with a box.

FIGS. 1A, 1B, and 1C are explanatory views showing a box 11 of a threaded joint for oil country tubular goods, a box protector 21 according to the present invention, and the state in which the protector 21 is mounted on the box 11, respectively. FIG. 2 is an explanatory view showing various cross-sectional shapes in the axial direction of a circumferential groove of a box protector according to the present invention together with a box.

Below, these components will be explained in sequence. A threaded joint for pipes is constituted by a pin and a box which are threadingly engaged with each other, but the present invention relates to a box protector, so an explanation will not be given of a pin.

Box 11

The box 11 typically has a cylindrical outer peripheral surface 11a. On its inner peripheral surface 11b, it has a female threaded portion 12 with tapered threads, a seal surface 13, and a shoulder surface (a torque shoulder) 14 on its rearmost portion. As shown in the drawings, the seal surface 13 is typically formed between the threaded portion 12 and the shoulder surface 14. The seal surface 13 of the box contacts an annular seal surface disposed on the outer peripheral surface of an unillustrated pin with a predetermined amount of interference and forms a metal-to-metal seal. In addition, the shoulder surface 14 of the box contacts a shoulder surface formed on the end surface of the unillustrated pin with a prescribed amount of interference. The female threaded portion 12 of the box is threadingly engaged with the male threaded portion of the pin.

In this manner, the female threaded portion 12, the seal surface 13, and the shoulder surface 14 of the box 11 form the contact surface which contacts corresponding portions of a pin at the time of makeup of a threaded joint. The female threads formed on the female threaded portion 12 may all be complete threads, but there are also cases in which the threads in the vicinity of one or both ends of the female threaded portion 12 are incomplete threads.

In the illustrated example, the shoulder surface 14 of the box 11 is provided in a position on the rearmost portion of the inner peripheral surface 11b of the box 11 (in the position of the front end of the pin) so as to contact the shoulder surface provided on the front end of the pin. However, the shoulder surface 14 can be provided on the open end 11c of the box 11 or on both the front end of the pin and the front end of the box, and the present invention can also be applied to these cases.

The shoulder surface 14 of the box 11 may be constituted by a surface which is perpendicular to the axial direction of a joint (the pipe axial direction), but preferably it is constituted by a sloping surface which projects in the direction of the open end (the entrance) 11c of the box (namely, towards the rear with respect to the insertion direction of the protector 21) from the inner peripheral surface 11b towards the center of the joint. Specifically, the shoulder surface 14 slopes rearwardly in the insertion direction at an angle θ with respect to the direction perpendicular to the pipe axis (the radial direction of the joint, which is the vertical direction in FIG. 1), but as mentioned above, it is also possible for it to be a vertical surface for which θ=0°.

Figure 3:
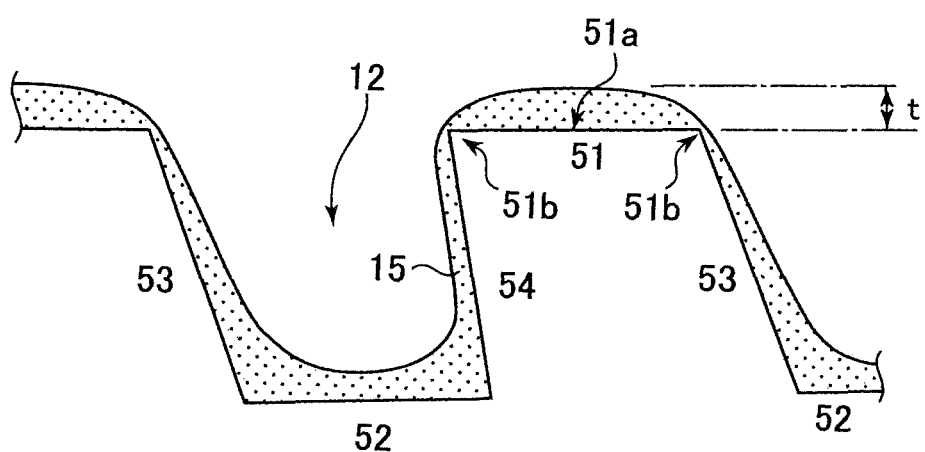
FIG. 3 is an explanatory view schematically showing a cross section in the axial direction of a solid lubricating coating formed on a female thread of a box.

As schematically shown in the axial cross-sectional views of FIGS. 3 and 4, the female threaded portion 12 of the box may be covered by a solid lubricating coating 15. Preferably the entirety of the contact surface of the box (namely, the female threaded portion 12, the seal surface 13, and the shoulder surface 14) has a solid lubricating coating 15. In order to prevent rust, the inner peripheral surface other than the contact surface of the box and the end surface 11c of the open end may also be covered with a solid lubricating coating.

The solid lubricating coating is typically a coating containing a lubricating powder (a solid lubricant) dispersed in a suitable binder. There have been many proposals from in the past concerning solid lubricating coatings for threaded joints for pipes, and these coatings can be suitably employed. In a typical solid lubricating coating, the binder is an organic resin having relatively excellent heat resistance such as an epoxy resin, a polyacrylate resin, a polyimide resin, or a polyamide-imide resin, but a solid lubricating coating which uses an inorganic film-forming component such as silica sol, a hydrolyzable silane compound, a titanium alkoxide, an alkali metal silicate, or a phosphate is also known.

It has been proposed to form a solid lubricating coating as two or more layers or to laminate a liquid lubricating coating or a sold corrosion preventing coating atop a solid lubricating coating, and it is possible to employ such a layered coating structure.

A solid lubricating coating which is particularly suitable for at least the threaded portion of a box in the present invention is a coating like that disclosed in Patent Document 3 which contains a lubricating powder in a matrix which exhibits plastic or viscoplastic rheological properties, and preferably a coating formed by spray coating (namely, hot melt coating) of a composition in which its matrix is in a molten state. Since a box is typically formed on a short coupling, hot melt coating on the surface of a box is easier than on the surface of a pin which is typically formed on the end of a long steel pipe.

Preferably, a solid lubricating coating of this type comprises 70-95 mass % of a matrix and 5-30 mass % of a lubricating powder. Since the proportion of a lubricating powder is small, the coating as a whole can exhibit plastic or viscoplastic rheological behavioral properties, which are the properties of the matrix. A matrix which exhibits plastic or viscoplastic rheological behavior preferably has a melting point in the range of 80-320° C.

This matrix preferably comprises a thermoplastic polymer, a wax, and a metal soap. More preferably, it further contains a corrosion inhibitor and a water-insoluble liquid resin.

The coating thickness (the average thickness) of the solid lubricating coating is frequently in the range of 10-100 μm and preferably in the range of 25-60 μm.

The structure of portions of the box 11 other than those described above may be the same as for a usual box of this type. Such a structure is known to those skilled in the art, so a further explanation concerning the box 11 will be omitted.

Box Protector 21

The box protector 21 is a protector for protecting the box 11, and it is designed to be mounted inside the box 11 by threads. In the illustrated example, the box protector 21 comprises a tubular body 21a which is closed at a location to the rear of the front end 21b in the direction of insertion of the protector and which is open at the other end (the rear end 21c). The tubular body 21a has an axial length which is longer than that of the contact surface of the box 11 which it protects, and on its outer peripheral surface, it has a male threaded portion 22 having male threads which threadingly engage with the female threads of the female threaded portion 12 of the box 11.

The tubular body 21a of the protector 21 is made of a resin. It is typically manufactured by injection molding of a resin including the threaded portion on its outer peripheral surface. Resins which have been used in the past for manufacture of protectors for threaded joints for pipe can be used. Specific examples of such a resin include low density polyethylenes and high density polyethylenes.

A tubular metal member 24 which is open at both ends is often fit inside the tubular body 21a which is made of a resin. Accordingly, the tubular body 21a of the protector is made of a resin reinforced by metal or a resin alone. By forming the portion of the protector which contacts the box from a resin which is softer than metal, it is possible to prevent damage to the surface of the box when mounting the protector on the box.

The external shape of the tubular metal body 24 can be any shape which can fit onto the inner peripheral surface of the tubular body 21a of the protector. In the illustrated example, a recess 21d is formed in the rear end surface 21c of the protector 21, the rear end portion of the tubular metal body 21a is formed with a bent portion which is bent into a circular shape by press working, and the tubular metal body 24 is secured to the protector 21 by the spring action of the end bent portion which is inserted into the recess 21d. Other securing methods can also be employed. When such a tubular metal body is not fit into the protector, the closed portion 25 of the protector can be located at the rear end surface 21c or in the vicinity thereof.

The box protector 21 forms seal portions by contacting the box 11 on both sides of the contact surface of the box 11 protected by the protector. These seal portions are respectively referred to as a first seal portion and a second seal portion. Preferably, the first seal portion contacts the shoulder surface 14 of the box 11 while the second seal portion contact the open end surface 11c of the box. The outer surface of the protector 21 preferably has a shape in which it does not contact the surface of the box 11 (the inner surface of the coupling) except for the first seal portion, the second seal portion, and the male threaded portion 22. In order to ensure that the protector does not contact the seal surface 13 of the box 11, it is preferred that the gap between the seal surface 13 of the box and the opposing portion of the box protector 21 be set to a large value. When the female threaded portion 12 on the inner peripheral surface of the box 11 has tapered threads as shown in the figures, the outer peripheral surface of the tubular body 21a of the protector 21 preferably has a tapered shape with substantially the same slope. The shape of the inner peripheral surface of the protector 21 is not limited, and it can have a roughly cylindrical shape as shown in the figures or a tapered shape.

The number of threads of the male threaded portion 22 of the box protector 21 may be set to be the same as the number of complete threads of the box 11 so as to threadingly engage with all the complete threads of the female threaded portion 12 of the box 11. In this case, the male threaded portion 22 of the box protector 21 extends the entire axial length of the portion of the protector opposing the complete threads of the female threaded portion 12 of the box 11.

However, the purpose of the male threaded portion 22 of the box protector 21 is to secure the protector 21 in a predetermined position on the box 11 and to prevent the protector 21 from falling off the box 11 when a steel pipe for an oil country tubular good receives an impact during transport or handling. Therefore, a high thread makeup force which is applied to the male threaded portion or the female threaded portion of a threaded joint for pipes, which is always subjected to an extremely high internal and external pressure, is not necessary. Therefore, in a preferred embodiment, the number of threads of the male threaded portion 22 of the box protector 21 is preferably kept to the minimum number necessary for securing the protector and preventing it from falling off. This number is 3-5 threads, preferably 3-4 threads, and most preferably 3 threads. With two threads, it is not possible to form a tight threaded connection, and it is not possible to secure the protector and prevent it from falling off.

Figure 4A:
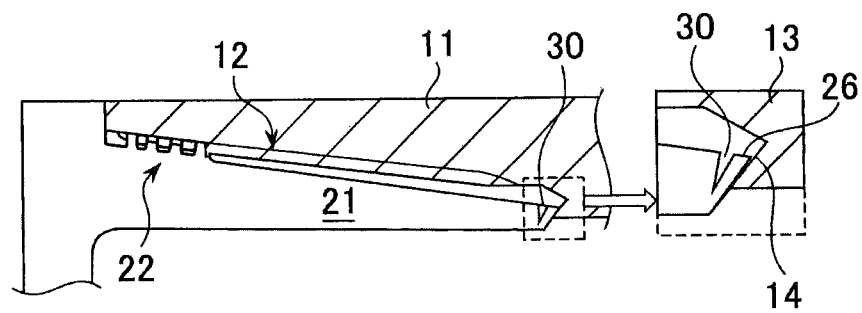
FIG. 4A is an axial cross-sectional view schematically showing a portion of a box on which a box protector according to the present invention is mounted.

In this case, as shown in FIG. 4A, the male threaded portion 22 of the protector 21 is preferably located opposite the threads closest to the entrance (the open end) 11c of the box in the complete threads of the female threaded portion 12 of the box 11. In this manner, because the complete threads of the box 11 which interfere with the threads of the male threaded portion 22 of the protector 21 are limited to the several threads closest to the entrance, it is possible to minimize damage to the female threaded portion of the box 11 due to interference with the threads of the male threaded portion 22 of the protector 21 and damage to a coating when the female threaded portion 12 is coated with a solid lubricating coating 15.

The box protector 21 has a shoulder surface 21b, which forms a first seal portion by sealingly contacting the shoulder surface of the box. In the embodiment shown in FIG. 1, the protector 21 has a shoulder surface 21b at its front end in the direction of insertion (in this case, the shoulder surface 21b being also referred to below as the front end surface), and this shoulder surface 21b forms the first seal surface by contacting the shoulder surface 14 at the rearmost portion of the box 11.

The front end surface 21b of the box protector 21 which forms the first seal portion is a sloping surface which slopes in the same direction as the shoulder surface 14 of the box 11, namely, backwards in the insertion direction of the protector towards the center of the joint with respect to the direction perpendicular to the pipe axis so as to contact the shoulder surface 14 of the box 11, and the angle of slope θP of the front end surface 21b of the protector 21 is made larger than the angle of slope θ of the shoulder surface 14 of the box 11 which it contacts (i.e., θP>θ). Accordingly, the shoulder surface 21b of the protector is made a sloping surface even when the shoulder surface 14 of the box 11 is vertical. The reason why is discussed below.

The tubular body 21a of the box protector 21 has on its outer peripheral surface a circumferential groove 30 which extends entirely around its outer peripheral surface in the vicinity of its front end surface 21b. The cross-sectional shape of the circumferential groove 30 in the axial direction is not limited to the V shape shown in FIG. 1. As shown in FIG. 2, it can have a cross-sectional shape which is a circular arc, a U shape, a trapezoidal shape, or a combination of these shapes, or it may have a cross-sectional shape other than these. A U shape includes a horseshoe shape in which the opening of the U is narrowed.

The position and the cross-sectional shape of the circumferential groove 30 are such that it is possible to form the first seal portion by elastic deformation of the portion in the vicinity of the groove 30 of the protector body 21 by the torque applied at the time of mounting the protector. Namely, due to elastic deformation of the protector body 21a in the periphery of the groove 30 when the front end surface 21b of the protector 21 contacts the shoulder surface 14 of the box 11 at the time of mounting of the protector, the portion 26 of the protector body 21a ahead of the groove 30 (the portion between the groove 30 and the front end surface 21b) can bend backwards so as to decrease the width of the groove in the axial direction. As a result, the angle of slope of the front end surface 21b of the protector 21 decreases. Accordingly, by inserting the protector into the box (by threadingly engaging the threads) until the angle of slope θP of the protector 21, which is larger than the angle of slope θ of the shoulder surface 14 of the box 11, decreases to the same angle of slope as the angle of slope θ of the box, the front end surface 21b of the protector 21 is made to intimately contact the shoulder surface 14 of the box 11 in the form of an areal contact rather than a line contact, and the sealing properties of the first seal portion can be improved.

As shown in FIG. 1A, for threaded joints for pipes having the same outer diameter, the inner diameter D1 of the box 11 varies as the wall thickness varies. In addition, the angle of slope θ of the shoulder surface of the box sometimes varies from box to box. By making the angle of slope θP of the front end surface of the protector larger than θ, it becomes easy to make box protectors 21 of the same shape applicable to multiple types of boxes 11 having different wall thicknesses or different angles of slope θ. The difference between θP and θ is preferably in the range of from 5° to 20°.

A second seal portion is provided in the vicinity of the opposite end from the first seal portion (the front end surface 21b) of the box protector 21, whereby the contact surface of the box 11 are isolated from the exterior when the protector 21 is mounted on the box. In this manner, the contact surface of the box is prevented from contacting water, oil, dust, foreign matter, and the like. As a result, when the contact surface is covered by a solid lubricating coating, dust or foreign matter is prevented from adhering to the coating, and deterioration of the coating is suppressed. When the contact surface is not covered by a solid lubricating coating, corrosion of the contact surface is suppressed. These phenomena are all causes of a decrease in galling resistance, so the present invention can improve the galling resistance of a box.

The second seal portion is disposed in a location outwards of the contact surface of the box when the protector 21 is mounted on the box 11. Accordingly, the axial length of the protector 21 becomes longer than the axial length of the contact surface of the box on which the protector is mounted.

There are no particular limitations on a means of forming the second seal portion of the protector 21 as long as a reliable seal portion can be formed between the protector 21 and the box outwards of the contact surface of the box (to the rear in the illustrated example). Considering the ease of forming a seal, it is preferable to form the second seal portion by contacting the end surface of the opening of the box 11. The second seal portion preferably has a seal structure utilizing an elastic material which has an excellent sealing effect.

As shown in FIGS. 1B and 1C, in a preferred embodiment, an elastic seal ring 28 is disposed on the outer peripheral surface of the tubular body 21a of the protector 21 so as to contact (abut) the open end surface 11c of the entrance of the box when the protector 21 is mounted on the box 11. As a result, the entire inner peripheral surface of the box and the surface of the open end of the box can be isolated from the exterior. The elastic seal ring 28 preferably has elasticity such that it can be displaced (shrunk) by at least 0.5 mm in the axial direction. The thickness of the seal ring in the axial direction is preferably at least 5 mm. Examples of preferred materials for the elastic seal ring include nitrile rubbers and silicone rubbers.

As shown in the figures, a circumferential groove 31 having an axial width slightly narrower than the thickness of the seal ring 28 may be provided in the outer peripheral surface of the protector 21 in order to secure the seal ring 28. The side wall on the front side of the groove 31 is preferably positioned slightly forwards (by a distance smaller than the above-described displacement) of the position of the end surface 11c of the open end of the box 11 when the protector 21 is mounted on the box 11 whereby the elastic seal ring 28 is compressed by the end surface 11c of the open end of the box 11 so that the thickness of the seal ring 28 is shrunk. In the illustrated example, the thickness of the seal ring is shrunk by approximately 1.0 mm. As a result, the sealing properties of the second seal portion provided by the elastic seal ring are improved.

The elastic seal ring 28 which constitutes the second seal portion intimately contacts the open end surface 11c of the open end of the box 11 as described above. In the illustrated example, the end surface 11c of the open end of the box is a surface perpendicular to the axial direction, so the side surface of the elastic seal ring 28 is also made a perpendicular surface.

In FIGS. 1A and 1B, symbol PCL is the distance (mm) in the axial direction from the intersection between the protector end surface 21b and the outer peripheral surface of the protector to the second seal portion (in the illustrated example, the side wall on the front side of the circumferential groove 31), symbol HL is the distance (mm) in the axial direction from the corner where the front end surface 21b of the protector intersects the outer peripheral surface of the protector to the edge of the opening on the front side of the circumferential groove 30, symbol H is the depth (mm) of the circumferential groove 30 in the direction perpendicular to the pipe axial direction, symbol PA is the diameter (mm) of the outer peripheral surface of the protector at the end surface 21b of the protector, symbol MUL is the distance (mm) in the axial direction from the end surface 11c of the open end of the box 11 to the corner where the seal portion 13 intersects the shoulder surface 14 of the box, and symbol DA is the diameter (mm) at the corner where the seal portion 13 and the shoulder surface 14 of the box 11 intersect (the outer diameter of the shoulder surface 14).

PCL is preferably equal to MUL±0.5 (mm), and more preferably PCL equals to MUL. Even if PCL equals to MUL, since the axial length of the protector 21 is reduced when mounted on the box 11 by the shrinkage of the circumferential groove 30, the seal ring 28 can be compressed.

Figure 7:
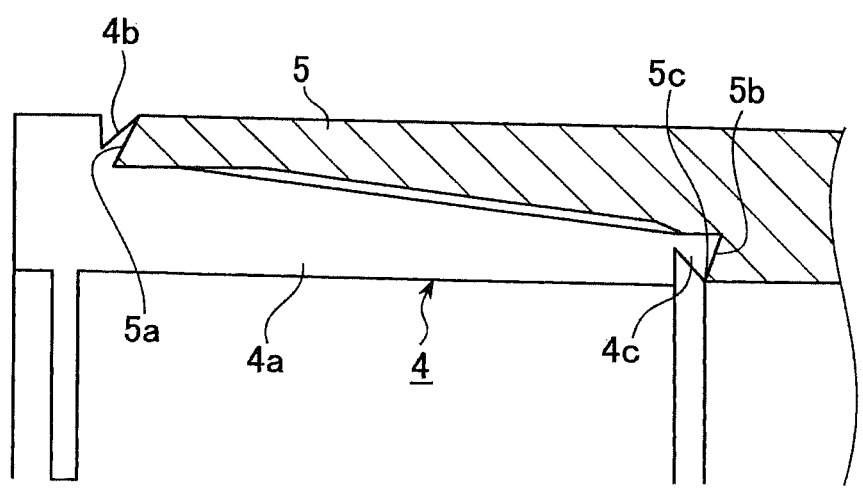
FIG. 7 is an explanatory view showing a box protector disclosed in Patent Document 5.
Figure 8:
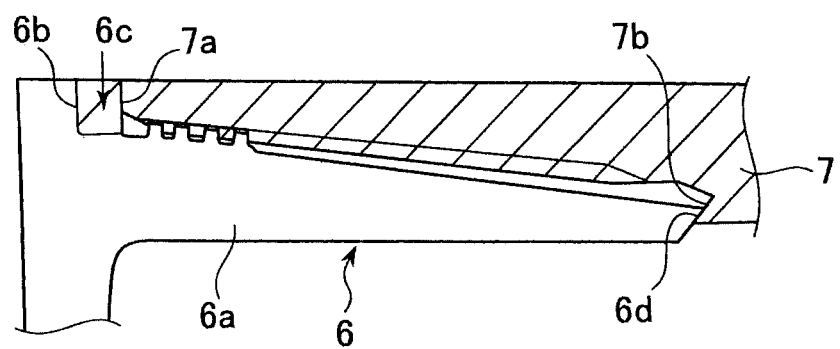
FIG. 8 is an explanatory view showing a box protector disclosed in Patent Document 6.

The separation HL in the axial direction between the circumferential groove 30 and the protector end surface 21b is preferably 0.5-2.0 mm and more preferably 1.0-1.5 mm. Due to the presence of this separation of the groove 30 from the tip end 21b of the protector, the problem of easily chipping away at the corner of the groove which is observed in the prior-art box protector shown in FIG. 7 can be avoided.

The depth H of the circumferential groove 30 is selected so that the periphery of the groove can elastically deform and so that fracture of the groove does not take place in the groove when a pressing torque is applied to the front end surface 21b of the protector 11 by the shoulder surface of the box 11 when mounting the protector 21 on the box 11. As a result of this elastic deformation, the groove width at the top of the groove 30 (the axial length of the groove opening) preferably decreases by at least 0.2 mm and more preferably by at least 0.3 mm. In the example shown in FIG. 1C, the groove width at the top of the groove decreases by approximately 0.5 mm when mounting the protector. The depth H of the groove necessary for such elastic deformation varies with the structure of the protector and the type of resin, but it is preferably 3.0-6.0 mm and more preferably 4.0-5.0 mm when HL is 1.0-1.5 mm. The wall thickness of the protector at the front end surface 21b is preferably at least 4.5 mm.

In order to form a gap between the box 11 and the protector 21 which prevents the inner peripheral surface of the box from contacting the outer peripheral surface of the protector except for the threaded portion 22 of the protector when the protector 21 is mounted on the box, PA is preferably made less than DA. As a result, when the contact surface of the box 11 is covered with a solid lubricating coating, the damage to the coating by mounting of the protector can be minimized. The difference between PA and DA is preferably at least 1.0 mm.

The reason why the seal provided by the protector 21 becomes inadequate at either the end surface 11c or the shoulder surface 14 at the rearmost portion of the box 11 as described above with respect to Patent Documents 5 and 6 is due to unavoidable variations in the dimensions of the protector 21 which is manufactured by injection molding of a resin. Taking into consideration contraction and expansion of the material, a tolerance of around 1 mm is unavoidable as a manufacturing accuracy of a protector body 21a made of a resin.

The body of the box 11 also has variations in dimensions due to minute tolerances. Therefore, in order to simultaneously contact the end surface 11c and the rear shoulder surface 14 of the box 11 with the box protector 21, it is advantageous that the seal portions of the box protector 21 have an elastic structure which can absorb variations in the dimensions.

Even a box protector having the shape disclosed in Patent Document 6 can increase the sealing properties of both the end surface 11c at the entrance of a box and the shoulder surface 14 at the other end of the box by increasing the tightening torque when mounting the protector on a box to above a conventional level. However, an equally high torque becomes necessary also when removing the protector from the box on the field, which is not desirable. Therefore, from a practical standpoint, it is desirable to easily contact both ends of a box with a conventional torque for securing a protector.

Considering sealing properties, an elastic seal ring provides a greater elastic effect than a seal portion utilizing elastic deformation of the resin constituting the protector and is advantageous for forming a seal. Therefore, it is conceivable to use an elastic seal ring for each of the two seal portions of a protector. However, it is necessary to take into consideration the cost required for disposition of two elastic seal rings and the increased possibility of the seal rings falling into a well.

Therefore, in a box protector according to the present invention, an elastic material and specifically an elastic seal ring 28 is provided as a seal only in the portion of a protector 26 which contacts the end surface 11c of the open end of a box 11. The other seal which contacts the shoulder surface 14 in the rearmost portion of the box is constituted by an elastically deformable portion which is flexible in the axial direction and which is provided by a circumferential groove 30 located in the vicinity of the front end surface 21b of the tubular body 21a of the protector 21. These two seal portions make it possible to absorb unavoidable variations in the dimensions of the box protector 21 and reliably produce sealing contact with both the end surface 11c of the open end of the box and at the shoulder surface 14 in the rearmost portion of the box. As a result, corrosion and deterioration of the contact surface of the box (and of a solid lubricating coating when such a coating is formed), and contamination and injury of the box due to infiltration of foreign matter can be prevented with certainty.

(Relationship Between the Solid Lubricating Coating and the Threaded Portion of the Protector)

The contact surface of the box including at least the female threaded portion is preferably covered by the above-described solid lubricating coating. As a result, it is unnecessary to apply a viscous liquid lubricant such as a compound grease to the contact surface of the box each time makeup of a threaded joint is carried out, and the operating efficiency of makeup of a threaded joint is increased.

The thickness of a solid lubricating coating which covers a thread is not uniform in an axial cross section of the threads. A solid lubricating coating is generally formed by applying a liquid coating composition to the surface of a threaded joint followed by solidification of the applied coating by drying, heating, cooling, irradiation with ultraviolet light, or the like. Therefore, as shown in FIG. 3 for a thread having a thread crest 51, a thread root 52, a stabbing flank 53, and a load frank 54, the solid lubricating coating 15 which is formed on the threaded portion is thick at the center 51a of the thread crests 51 and the coating thickness varies in the axial direction so as to become thinner toward both ends, and the coating thickness becomes extremely thin at the corners 51b of the thread crests 51. The cause of such a coating thickness distribution is thought to be that it is inherently difficult for a liquid coating composition to adhere to the corners 51b and that the coating often contracts at the time of curing of the coating. In contrast, on the thread roots 52 where liquid accumulates, the coating thickness becomes a maximum in the corners, but the variation in the coating thickness in the axial direction on the thread roots 52 is smaller than on the thread crests 51.

The solid lubricating coating 15 easily peels off the female threaded portion 12 of the box 11 and particularly from the thread crests 51 at the time of mounting the box protector 21 on the box 11. The reason therefor is thought to be that the solid lubricating coating 15 is extremely thin on the corners 51b of the thread crests 51. Due to contact with the male threaded portion 22 of the box protector 21, the solid lubricating coating 15 first peels from the corners 51b. Then, at the time of interference with the male threaded portion 22 of the box protector 21, the solid lubricating coating 15 peels off the entirety of the thread crests 51.

Therefore, by making the shape of the threads of the male threaded portion 22 of the box protector 21a shape such that contact with the thread crests 51 of the female threaded portion 12 of the box 11 is avoided and contact primarily takes place with the thread roots 52 of the female threaded portion 12 of the box 11, it is possible to prevent the solid lubricating coating 15 which covers the female threaded portion 12 of the box 11 from peeling caused by mounting of the box protector 21, leading to a marked improvement in the galling resistance of the box 11 after removal of the box protector 21.

For this purpose, the thread height H1 of the male threaded portion 22 of the protector 21 and the thread height H2 of the complete threads of the female threaded portion 12 of the box 11 satisfy the relationship H1>H2, and the difference (H1–H2) between H1 and H2 is preferably larger than the maximum coating thickness t (the total thickness when there are two or more layers) on the thread crests 51 of the solid lubricating coating 15 which covers the female threaded portion 12 of the box 11. The difference between H1 and H2 is preferably in the range of 10-1,000 μm. More preferably, this difference is around 1.5-3 times the maximum coating thickness t.

Figure 4B:
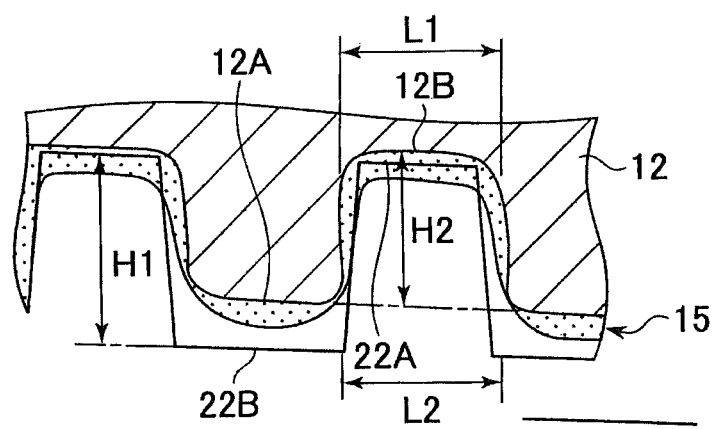
FIG. 4B is an axial cross-sectional view schematically showing a portion of the complete threads of the female threaded portion of a box threadingly engaged with the male threaded portion of a box protector according to the present invention.

By having the thread heights H1 and H2 satisfy the above-described relationship and conditions, as shown in FIG. 4B, when the box protector 21 is mounted on the box 11 and the threaded portions 12 and 22 of the two members are made to interfere, the thread crests 22A of the male threaded portion 22 of the box protector 21 interfere with the thread roots 12B of the female threaded portion 12 of the box 11, but a gap remains between the solid lubricating coating 15 which covers the thread crests 12A of the female threaded portion 12 of the box 11 and the thread roots 22B of the male threaded portion 22 of the box protector 21. Therefore, the solid lubricating coating 15 which covers the thread crests 12A of the female threaded portion 12 of the box 11 is prevented from contacting the threads of the male threaded portion 22 of the box protector 21 and from being damaged.

If H1=H2 or H1<H2, the thread crests of the female threaded portion 12 of the box 11 interfere with the thread roots of the male threaded portion 22 of the box protector 21. Because the threads undergo relative movement in the axial direction at this time, the solid lubricating coating 15 begins to peel off, particularly from the corners of the thread crests where the coating thickness is extremely small, and the possibility develops of the solid lubricating coating 15 eventually being completely peeled off the thread crests.

Because the thread crests of the male threaded portion 22 of the box protector 21 interfere with the thread roots of the female threaded portion 12 of the box 11, damage to the solid lubricating coating 15 on the thread roots of the box 11 cannot be avoided. However, as stated above, the coating thickness of the solid lubricating coating 15 on the thread roots is larger than the coating thickness on the thread crests, and it is particularly large in the corners of the roots. Therefore, even if the thread roots of the female threaded portion 12 of the box 11 interfere with the threads of the male threaded portion 22 of the box protector 21, complete peeling of the solid lubricating coating 15 does not readily take place, and the solid lubricating coating 15 partially remains on the thread roots of the female threaded portion 12 of the box 11. In addition, the solid lubricating coating 15 which is pushed away by interference sometimes moves to the flanks of the threads of the female threaded portion 12 of the box 11. Therefore, even if a lubricating grease is not applied at the time of makeup of a threaded joint, due to the solid lubricating coating 15 remaining on the thread roots and the solid lubricating coating 15 which moves around from the flanks, sufficient lubricating properties are imparted to the thread roots of the female threaded portion 12 of the box 11. Of course, a sound solid lubricating coating 15 is present on the crests of the threads of the female threaded portion 12 of the box 11. Thus, galling of a threaded joint for pipes which takes place at the time of makeup after removal of a box protector 21 can be effectively prevented by just the solid lubricating coating 15 on the box 11, even if the pin of the threaded joint does not undergo any special lubricating treatment (such as formation of a solid lubricating coating).

In order to minimize damage to the solid lubricating coating 15 on the thread flanks of the female threaded portion 12 of the box 11 caused by the box protector 21, the thread width L2 of the male threaded portion 22 of the box protector 21 is preferably 0.5-0.75 times the thread root width L1 of the complete threads of the female threaded portion 12 of the box 11. As a result, as shown in FIG. 4B, even if the female threaded portion 12 of the box 11 is subjected to a compressive force or a tensile force by the box protector 21, the solid lubricating coating 15 on one of the two flanks of the threads of the box avoids contact with the threads of the male threaded portion 22 of the box protector 21 and is not readily damaged. If the thread width L2 becomes too small, the tightening force by the threads becomes inadequate.

Figure 5A:
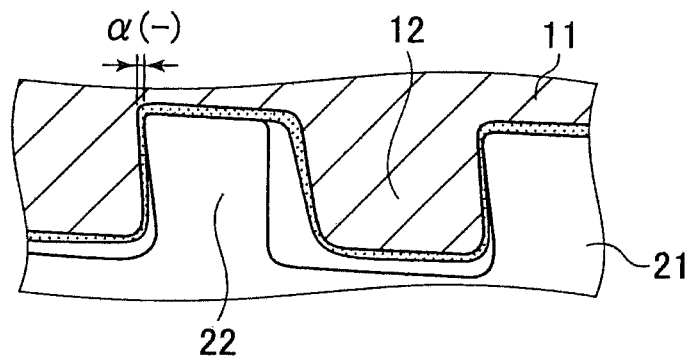
FIGS. 5A-5C are axial cross-sectional views schematically showing a portion of the complete threads of the female threaded portion of a box threadingly engaged with the male threaded portion of a box protector.
Figure 5B:
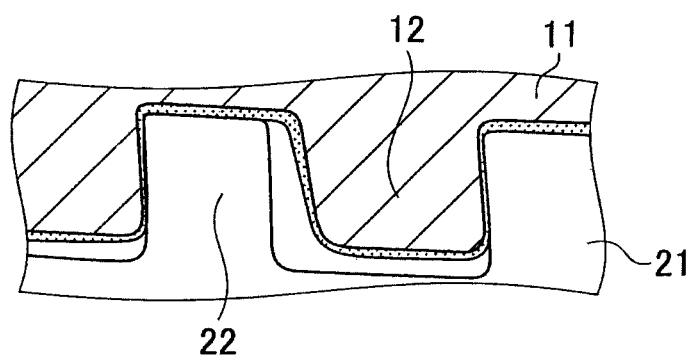
Figure 5C:
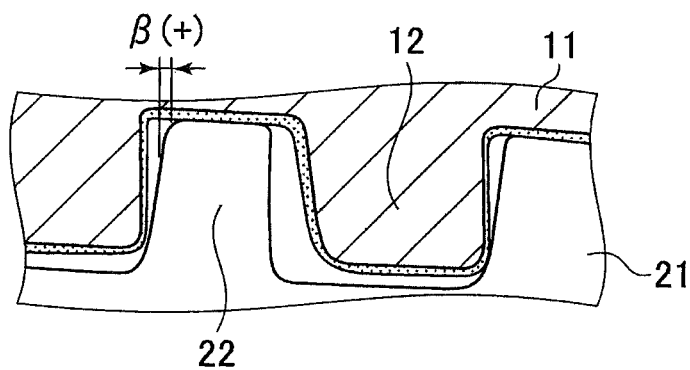

FIGS. 5A-5C are axial cross-sectional views schematically showing a portion of the complete threads of the female threaded portion 12 of a box 11 which is threadingly engaged with the male threaded portion 22 of a box protector 21.

In FIGS. 5A-5C, the female threaded portion 12 of the box 11 is the same in all of these figures in which the load flank angle α of the threads is a negative angle. In contrast, the load flank angle β of the threads of the male threaded portion 22 of the box protector 21 is different in these figures in such a manner that it is a negative angle in FIG. 5A, it is vertical (0°) in FIG. 5B, and it is a positive angle in FIG. 5C. The stabbing flank angle of the threads of the male threaded portion 22 of the protector 21 is vertical (0°).

The load flank angle α of the threads of the female threaded portion 12 of the box 11 is often nearly a vertical angle, namely, it is in the range of −3° to +3°. In this case, the load flank angle β of the threads of the male threaded portion 22 of the protector 21 is also preferably substantially a vertical angle (−2° to +2°), as shown in FIG. 5B. As a result, after the protector 21 is mounted on the box 11, contact between the load flanks of the female threaded portion 12 of the box 11 and the male threaded portion 12 of the protector 11 can be stabilized. Accordingly, the protector 21 is stably mounted on the box 11 even when the number of threads of the male threaded portion 22 of the protector 21 is a small value of 3-5.

On the other hand, when the threads of the female threaded portion 12 of the box 11 are hook shaped such that the load flank angle α is a negative angle, the load flank angle β of the threads of the male threaded portion 22 of the protector 21 is preferably substantially equal to the load flank angle α of the threads of the female threaded portion 12 of the box 11 (within the range of α+2°) or smaller. For example, when the load flank angle α of the threads of the female threaded portion 12 of the box 11 is −3°, the load flank angle β of the threads of the male threaded portion 22 of the protector 21 is substantially equal to the load flank angle α when β is −1° to −5°. As a result, as described above, the protector 21 is stably mounted on the box 11.

When the load flank angle θ of the protector 21 is smaller than the load flank angle α of the box 11 (when α is −3°, β is smaller than −5°, such as −8°), contact between the load flanks of the box and the protector can be concentrated in the corners of the thread roots of the female threaded portion 12 of the box 11 or can be restricted to just the corners of the thread roots. As a result, the region of contact of the threads of the male threaded portion 22 of the protector 21 with the female threaded portion 12 of the box 11 is more limited, and the solid lubricating coating 15 on the thread crests of the box can be effectively protected.

The invention claimed is:

1. A box protector for a threaded joint for pipes which is mounted on a box of a threaded joint for pipes having a pin-box structure in order to protect a contact surface of the box, the contact surface of the box having a female threaded portion including complete threads and an unthreaded metal contact portion including at least a shoulder surface, the shoulder surface being sloped so as to recede towards the center axis of the joint by an angle θ with respect to the direction perpendicular to the axis of the threaded join or being parallel to the perpendicular direction, wherein the box protector has a tubular body made of a resin with an axial length which is longer than that of the contact surface of the box and having a structure which can form a first seal portion and a second seal portion by contacting the box surface on both sides of the contact surface of the box, and wherein the tubular body has on its outer peripheral surface a male threaded portion which threadingly engages with at least a portion of the complete threads of the female threaded portion of the box, the box protector being characterized in that:

the tubular body of the protector has a shoulder surface which forms a first seal portion which sealingly contacts the shoulder surface of the box, the shoulder surface of the protector slopes to the rear in the direction of insertion of the protector towards the center axis of the joint by an angle θP with respect to the direction perpendicular to the pipe axial direction, and the angle of slope θP of the shoulder surface of the protector is larger than the angle of slope θ of the shoulder surface of the box;

the tubular body of the protector has a circumferential groove in its outer peripheral surface in the vicinity of the shoulder surface of the protector, and the position and the cross-sectional shape of the circumferential groove are such that under a torque applied when mounting the protector on the box, a portion of the tubular body in the vicinity of the circumferential groove elastically deforms so as to reduce the distance in the axial direction at the opening of the circumferential groove, thereby ensuring the formation of the first seal portion; and the second seal portion is formed by contacting an elastic material attached to the protector with the box surface; and a recess is formed in a rear end surface of the protector in the direction of insertion of the protector, and a tubular metal body having a circular bent portion formed at an end in a rear end surface side of the tubular metal body is fitted onto an inner peripheral surface of the protector; and the circular bent portion is inserted into the recess and contacts an outer periphery side wall of the recess, and the tubular metal body is secured to the protector by a spring action of the circular bent portion.

2. A box protector as set forth in claim 1 wherein the circumferential groove has an axial cross-sectional shape selected from a V shape, an arc shape, a U shape, a trapezoid shape, and a combination of these shapes.

3. A box protector as set forth in claim 1 wherein the axial distance at the open end surface of the circumferential groove is reduced by at least 0.2 mm by the elastic deformation.

4. A box protector as set forth in claim 1 wherein the second seal portion is formed by an elastic seal ring which is disposed on the outer peripheral surface of the tubular body of the protector so as to sealingly contact the box end surface when the protector is mounted on a box.

5. A box protector as set forth in claim 1 wherein all or a portion of the contact surface of the box including at least the female threaded portion thereof is covered with a solid lubricating coating.

6. A box protector as set forth in claim 5 wherein the thread height (H1) of the male threaded portion of the tubular body of the protector and the thread height (H2) of the complete threads of the female threaded portion of the box satisfy H1>H2, and the difference [H1−H2] between H1 and H2 is larger than the maximum coating thickness of the solid lubricating coating on crests of the complete threads of the box.

7. A box protector as set forth in claim 1 wherein the male threaded portion of the protector has 3-5 threads.

8. A box protector as set forth in claim 7 wherein the male threaded portion is disposed at a position opposing the female threads closest to the box entrance of the complete threads of the box.

* * * * *